United States Patent [19]

Gordon et al.

[11] Patent Number: 5,126,031
[45] Date of Patent: Jun. 30, 1992

[54] COPRECIPITATED HYDROGELS IN PRESSURE TOLERANT GAS DIFFUSION ELECTRODES

[76] Inventors: Arnold Z. Gordon, 23714 Woodway Rd., Beachwood, Ohio 44122; Ernest B. Yeager, 2 Bratenahl Pl., Apt. 5F, Cleveland, Ohio 44108; Donald A. Tryk, 2206 Delaware Rd., Cleveland Heights, Ohio 44118; M. Sohrab Hossain, 27 Royal Crest Dr., No. 7, Marlborough, Mass. 01752

[21] Appl. No.: 435,522
[22] PCT Filed: Mar. 2, 1988
[86] PCT No.: PCT/US88/00625
§ 371 Date: Oct. 12, 1989
§ 102(e) Date: Oct. 12, 1989
[87] PCT Pub. No.: WO88/06646
PCT Pub. Date: Sep. 7, 1988

Related U.S. Application Data

[63] Continuation-in-part of Ser. No. 20,746, Mar. 2, 1987, abandoned.

[51] Int. Cl.[5] ............................................. C25B 11/00
[52] U.S. Cl. ..................................... 204/242; 204/284; 429/42; 429/43; 429/41
[58] Field of Search ............... 204/252, 282, 283, 291, 204/290 R, 204, 294, 296, 242; 429/40, 43, 44, 45, 42, 41

[56] References Cited

U.S. PATENT DOCUMENTS

| | | | |
|---|---|---|---|
| 3,124,520 | 3/1964 | Juda | 204/86 |
| 3,284,238 | 11/1966 | White | 136/86 |
| 4,090,931 | 5/1978 | Motani et al. | 204/260 |
| 4,137,371 | 3/1979 | Blanchart et al. | 429/41 |
| 4,400,452 | 8/1983 | Bruder | 429/152 |
| 4,407,905 | 10/1983 | Takeuchi et al. | 429/42 |
| 4,514,474 | 4/1985 | Momyer et al. | 429/27 |
| 4,528,249 | 7/1985 | Galbraith | 424/15 |
| 4,534,845 | 8/1985 | McIntyre et al. | 204/283 |
| 4,614,575 | 9/1986 | Juda et al. | 204/265 |
| 4,615,954 | 8/1986 | Solomon et al. | 429/27 |
| 4,722,773 | 2/1988 | Plowman et al. | 204/98 |

FOREIGN PATENT DOCUMENTS 1226507 3/1971 United Kingdom .

OTHER PUBLICATIONS

DeCastro, et al., "Electrodes Coated with Polymer Networks Cross-Linked by γ-Irradiation," J. Electroanal. Chem., vol. 138, pp. 197-200 (1982).
Sheibley, et al., "Cross-Linked Polyvinyl Alcohol Films as Alkaline Battery Separators," J. Electrochem. Soc., vol. 130, No. 2, pp. 255-259 (Feb. 1983).
Szentirmay, et al., "Chemical Properties and Film Casting of Radiation-Grafted Ion Containing Polymers," J. Electrochem. Soc., vol. 131, No. 7, pp. 1652-1657 (Jul. 1984).
Fujita, et al., "An Electrochemical Oxygen Separator Using an Ion Exchange Membrane as the Electrolyte," J. Appl. Electrochem., 16, 935 (1986).
DeCastro, et al., "Electrodes with Polymer Network Films Formed by γ-Irradiation Cross-Linking," Anal. Chem., vol. 59, pp. 134-139 (1987).
The Electrosynthesis Co., Inc.-RAIPORE® membrane information sheet (undated).

*Primary Examiner*—John Niebling
*Assistant Examiner*—Kathryn Gorgos

[57] ABSTRACT

Gas diffusion electrodes and gas-generating or consuming electrochemical cells utilizing the same are disclosed. The electrode comprises an electronically conductive and electrochemically active porous body defining respective gas and electrolyte contacting surfaces, with a substantially gas impermeable layer covering the electrolyte contacting surface. The layer comprises an electrolyte-insoluble, ionomeric ionically conductive hydrophilic hydrogel formed by coprecipitation between at least first and second precursor polymers.

21 Claims, 6 Drawing Sheets

COPRECIPITATED HYDROGELS IN PRESSURE TOLERANT GAS DIFFUSION ELECTRODES

CROSS-REFERENCE TO RELATED APPLICATIONS

The present application is based on PCT International Application No. PCT/US88/00625 filed Mar. 2, 1988, which is a continuation-in-part of copending, commonly assigned application Ser. No. 20,746, filed Mar. 2, 1987 and now abandoned.

BACKGROUND OF THE INVENTION

1. Field of the Invention

This invention relates generally to gas diffusion electrodes and, more particularly, this invention relates to gas diffusion electrodes adapted for use in electrochemical cells utilizing an aqueous alkaline electrolyte and consuming or generating a gas via the electrochemical process occurring within the gas diffusion electrode.

2. Description of Related Art

The use of gas diffusion electrodes in fuel cells and metal-air batteries is well known. Gas diffusion electrodes have also been used in the electrolysis, either oxidation or reduction, of gaseous reactants. It is also possible to generate gases in such electrodes. In general, gas diffusion electrodes take the form of solid porous (gas and liquid permeable) bodies formed at least in part of an electronically conductive, electrochemically active material, and may include a catalyst. Such electrodes generally define an electrolyte contacting surface and a gas contacting surface. Electrochemical oxidation and reduction occur at the points in the electrode where the gas to be oxidized or reduced contacts both the electrolyte and the active material of the electrode. In the case of gas generation, electrolyte contacts the active material, and gas is generated at this interface.

Electrochemical cells utilizing such electrodes generally comprise the gas diffusion electrode, a spaced counter electrode, a liquid electrolyte (which is generally aqueous) which contacts both the counter electrode and the gas diffusion electrode, and a gas which contacts the gas diffusion electrode either (1) for reduction or oxidation of the gas or (2) produced via electrolytic generation. Circuit connections are disposed between the counter and gas diffusion electrodes. Additionally, the counter electrode may also be a gas diffusion electrode. A well-known example of such a design is the $H_2/O_2$ fuel cell.

Electrochemical batteries, for example, the metal-air type, commonly utilize either an aqueous alkaline or neutral (e.g., saline) electrolyte, while fuel cells may commonly utilize either acidic electrolytes or alkaline electrolytes. Other types of electrolytes are also used, depending upon the specific gas which is consumed or generated.

The use in electrochemical batteries of an oxygen-containing gas, such as air, which is reduced at the gas diffusion electrode is well known. However, the gas need not be oxygen-containing nor need it be reduced at the gas diffusion electrode. For example, hydrogen gas is oxidized in some fuel cells. The present invention is generally applicable to all such types of gas diffusion electrodes and cells.

The electronically conductive material in a gas diffusion electrode typically may be carbon. Additionally, a wide variety of catalysts, such as platinum or transition metal organometallic catalysts (such as porphyrins), are available.

In various applications, it is desirable that either or both the liquid electrolyte and the gaseous electrode reactant be flowed through the body of the cell over the electrode surfaces. Flowing electrolyte and/or flowed gaseous reactant are, of course, accompanied by a pressure drop across the cell, especially on the electrolyte side. This can be lead to excess pressures either on the gas-side or the electrolyte-side of the electrode. Furthermore, it may be desirable in certain circumstances to operate at an elevated gas pressure with respect to the electrolyte pressure. One example of such a situation would be one in which the performance is increased by pressurizing the gaseous reactant. In battery and fuel cell applications, it is desirable to obtain as high a cell voltage as possible at any given current density. One means of accomplishing this is to utilize a relatively high gas pressure or flow rate.

The use of a porous (e.g., typically 30%-60% porosity) gas diffusion electrode, however, poses difficult flow management problems. When gas pressure exceeds liquid electrolyte pressure by a sufficient amount, "blow-through" of gas through the electrode into the liquid electrolyte results. In conventional gas diffusion electrodes, this so-called "blow-through pressure" is usually much lower than is desirable for tolerance of substantial differential pressures between the gas and liquid sides of the cell.

For example, while it may be desirable to operate a cell at a gas vs. liquid differential pressure of up to 10 psi or more, typical air cathodes exhibit a gas blow-through pressure of less than about 0.25 psi. If the differential pressure exceeds the blow-through pressure, pumping of gas into the liquid electrolyte may result. (Typical blow-through pressures range from 0-1 psi, and are determined primarily by interfacial tension and pore size distribution.)

Conversely, if the liquid electrolyte pressure is higher than the gas pressure and the differential pressure exceeds the liquid bleed-through pressure, liquid may be pumped into the gas side of the cell, which may result in liquid in the gas manifold, with consequent pumping problems and a decrease in cell performance and useful cell life due to flooding of the active layer of the electrode.

In gas-generating cells, it is customary for the gas to be generated on the front face (electrolyte-side) of the electrode. The gas is thus generated as bubbles in the electrolyte, which can lead to removal of electrolyte from the cell and increased ohmic losses. Generation of gas in a gas diffusion electrode is more desirable, because the gas can exit the cell directly through the back of the electrode. Operation in this mode would require a certain amount of pressure tolerance. Even higher pressure tolerance would be required if the gas is generated in a pressurized state.

If the differential pressure between the gas and liquid sides of an electrochemical cell using a porous gas diffusion electrode is to be maintained at a low level, impractical pressure management problems result, especially in view of the fact that pressure levels vary from point to point on each side of the electrode.

The problems described are not readily amenable to correction by the use of a gas barrier material between the gas and electrolyte sides of the electrode, since such barriers tend to block the flow of electrolytic ions through the electrode and also strongly contribute to voltage losses or do not allow operation at a sufficiently high current density for the desired application. It is desirable to maintain the potential across the electrode at as positive a level as possible while maintaining as high a current density as possible. For example, it may be desired to operate a cell at a current density of up to as high as 500 mA/cm$^2$, typically at 100 mA/cm$^2$, while minimizing the voltage loss across the electrode. A voltage loss of less than 0.05 volts is preferred, with voltage losses of up to 0.25 volts being generally acceptable.

One approach to solving these problems is disclosed in Juda and Ilan U.S. Pat. No. 4,614,575 (Sep. 30, 1986), which involves the use of nonionic polymeric hydrogel as a layer applied by painting onto the electrolyte side of the gas diffusion electrode. The maximum pressure tolerance disclosed by the Juda, et al., patent is less than or equal to 40 inches of water (1.44 psi or 10.0 kPa), which is significantly less than that possible with the present invention.

SUMMARY OF THE INVENTION

It is an object of the present invention to overcome one or more of the problems described above.

According to the present invention, an ionomeric, ionically conductive, substantially gas impermeable layer is disposed over substantially the entire electrolyte contacting surface of a gas diffusion electrode adapted for use in a gas-generating or consuming electrochemical cell utilizing a liquid electrolyte. The layer comprises an electrolyte-insoluble, ionomeric ionically conductive hydrophilic hydrogel, and is preferably formed in situ on the electrolyte contacting surface by a coprecipitation reaction between at least two precursor polymers.

The invention also comprehends an electrochemical cell comprising the coated gas diffusion electrode spaced from a counter electrode and in contact with liquid electrolyte. A gas to be oxidized, reduced or generated is in contact with the gas side of the electrode, and circuit connections are disposed between the counter- and gas diffusion electrodes.

The electrode and cell of the invention are capable of operating at very high gas vs. electrolyte differential pressures at high current densities without significant voltage loss.

Other objects and advantages of the invention will be apparent to those skilled in the art from a review of the following detailed description taken in conjunction with the drawings and the appended claims.

DETAILED DESCRIPTION OF THE INVENTION

Figure 1:
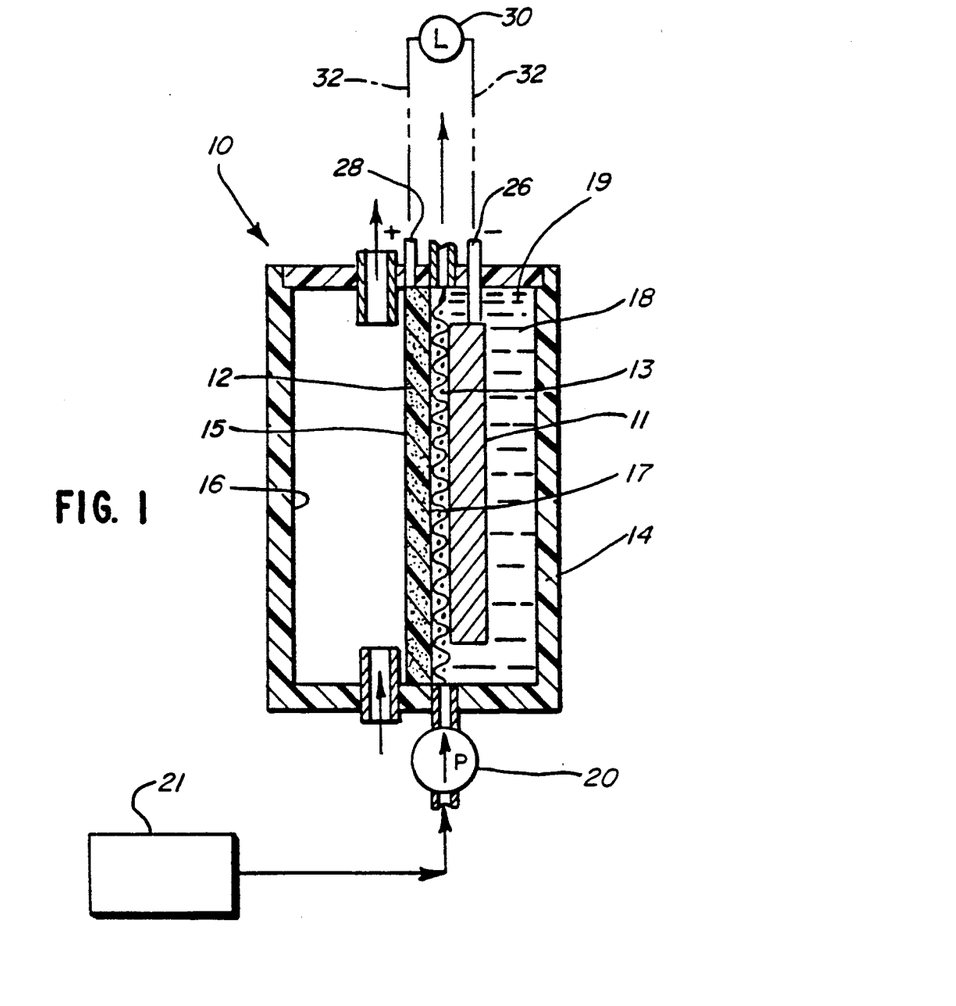
FIG. 1 is a transverse sectional view of one embodiment of an electrochemical cell in which the invention may be utilized.

FIG. 1 illustrates a typical embodiment of an electrochemical battery utilizing a gas diffusion electrode. This particular cell is an aqueous alkaline lithium-air cell. It is to be understood that the present invention is not limited to use in electrochemical batteries, nor to cells in which gas is consumed. Rather, the invention finds wide applicability in cells in which gas is either consumed or produced, via either reduction or oxidation, in which any of various electrolytes are used, etc.

The cell of FIG. 1 is described in detail in U.S. Pat. No. 4,528,249 (Jul. 9, 1985), the disclosure of which is incorporated by reference.

In FIG. 1, an electrochemical cell, generally designated 10, includes an anode 11, a gas consuming cathode 12, and a metal screen 13 interposed between the anode 11 and cathode 12 within an outer housing 14. In the embodiment of FIG. 1, the screen 13 is in electrical contact with the cathode 12 and is in mechanical (but not electrical) contact with the anode 11.

In the exemplary embodiment, the anode 11 comprises a lithium anode, which may comprise elemental lithium metal or lithium alloyed with alloying material, such as small amounts of aluminum.

The screen 13 is not in electrical contact with the anode 11, due to the presence of an insulating, porous lithium hydroxide (LiOH) film which is formed on the anode surface by contact thereof with humid air, and is well known in the art. It is to be noted, however, that this particular feature is peculiar to the aqueous lithium-air cell. In other types of metal-air batteries and fuel cells, either an electrically insulating porous separator layer or a simple electrolyte gap would be used. It should also be noted that the screen 13 is necessary to help restrain the gas diffusion electrode 12 against the gas pressure.

The cathode 12 is, in this case, an air cathode through which atmospheric air flows. Those skilled in the art, however, will recognize that such a cathode may operate with any oxygen-containing gas.

One surface 15 of the cathode 12 is exposed to ambient atmosphere (or a source of another oxygen-containing gas) in a chamber 16 of the housing 14, and the opposite surface 17 of the cathode 12 is contacted by the liquid electrolyte 18, which is flowed through a second chamber 19 in the housing 14 as by a suitable pump 20. In the illustrated embodiment, the electrolyte is provided from a reservoir 21 for suitable delivery when needed.

In FIG. 1, the anode 11 and cathode 12 each terminate in a respective terminal 26 or 28, and are connected to a load 30 through suitable circuit connections 32.

Typically, the cathode 12 comprises a structure formed of a suitable porous hydrophobic material, such as polytetrafluoroethylene (PTFE), mixed with carbon black, both pure and catalyst-containing. A preferred form of the cathode 12 is described below in connection with FIG. 2.

The screen 13 illustratively may comprise a woven metal wire screen formed of suitable non-corroding metal, which in the case of alkaline electrolyte may be nickel or silver plated nickel. If desired, the screen 13 may serve as a current collector if connected to the terminal 28.

In the embodiment of FIG. 1, liquid electrolyte, in this case an aqueous alkaline electrolyte, such as aqueous lithium hydroxide, is flowed through the chamber 19 by means of the pump 20. As such, there is a pressure drop across the chamber 19 in the direction of flow.

Further, air is flowed through the chamber 16 by means not shown, and there is a small pressure drop across the chamber 16 in the direction of flow by virtue thereof. However, those skilled in the art will recognize that the pressure drop across the gas chamber 16 is small in comparison to that in the electrolyte chamber 19.

As set forth above, FIG. 1 is intended to be exemplary only, as the invention is applicable to any of a variety of types of gas diffusion electrodes and electrochemical cells.

Figure 2:
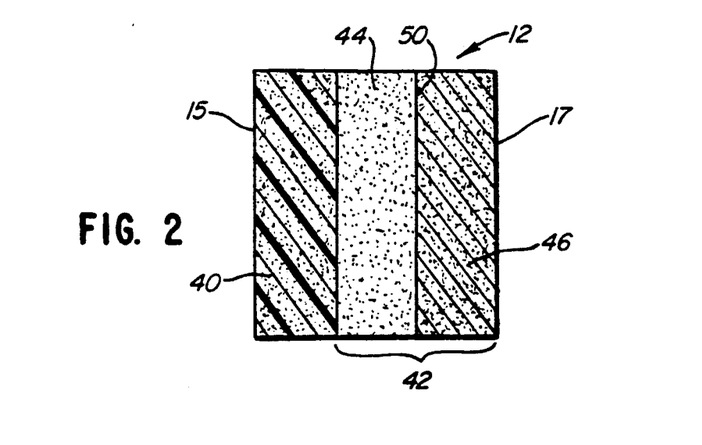
FIG. 2 is a schematic sectional view of a typical gas diffusion electrode with which the invention may be utilized.

FIG. 2 is a schematic depiction of the structure of a preferred embodiment of the cathode 12. As shown in FIG. 2, the electrode 12 is formed essentially of a two or three component laminate defining the gas contacting surface 15 and the opposed electrolyte contacting surface 17. An electronically conductive porous gas carrier layer 40 defines the gas contacting surface 15 and typically is a mixture of a hydrophobic material, such as porous PTFE (e.g., Teflon brand PTFE) with a carbon black, such as Shawinigan black (Chevron Chemical Co., Olefins and Derivatives Div., Houston, Tex.). A so-called "active layer" 42 comprises a layer 44 which comprises a mixture of carbon black, or catalyst supported on carbon black, and PTFE. An optional layer 46 of catalyst is disposed on the layer 44 at an interface 50. As shown in the schematic of FIG. 2, layers 44 and 46 appear to be discrete layers, but in practice may define a single layer or two layers, since the catalyst is generally adsorbed onto the surface of the material of layer 44. In some cases, the materials of the three layers 40, 44 and 46 may be intermixed in a single layer.

The entire structure of the electrode 12 of FIG. 2 is porous, generally exhibiting a porosity of 30%-60%.

A typical catalyst forming the layer 44 is heat-treated cobalt tetramethoxyphenyl porphyrin (CoTMPP) on a carbon black such as Vulcan XC-72 (Cabot Corp., Billerica, Mass.). The heat treatment is typically done at 400°-1000° C. in inert gas. The structure of CoTMPP is shown below:

This material is a currently-preferred catalytic mateial. Other catalysts include platinum, $MnO_2$ and transition metal macrocycles other than CoTMPP.

The function of the layer 40 is to allow ready transmission of gas to the active layer 44. Its hydrophobicity also acts to repel liquid electrolyte which exists in the active layer 44 in order to avoid leakage of the liquid electrolyte into the gas side of the cell. It also provides electronic conductivity.

The requisite consumption or generation of gas takes place in the active layer 44 where gas and liquid meet in the presence of the active material and optional catalyst, as is well known in the art.

Figure 3:
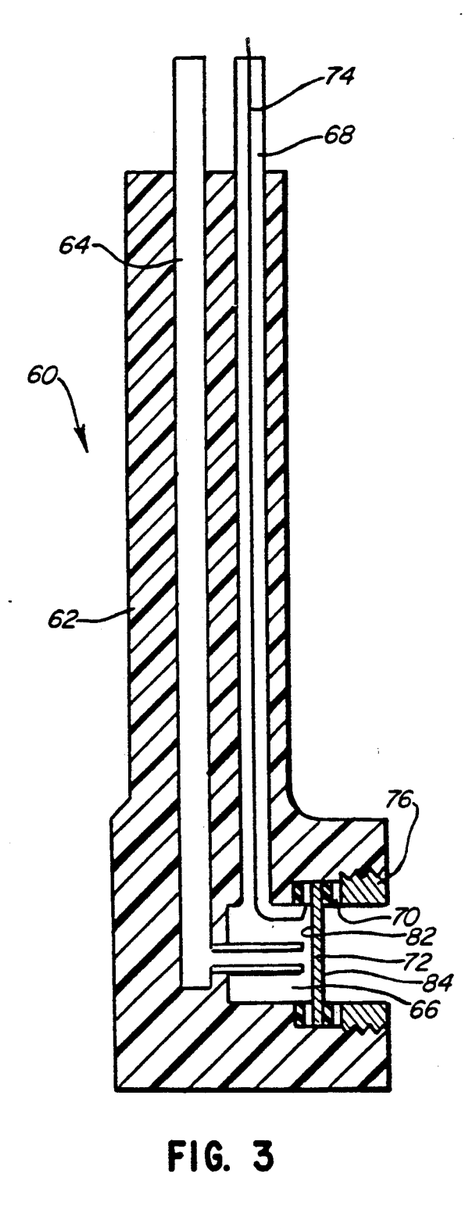
FIG. 3 is a sectional view of an electrode holder useful in testing gas diffusion electrodes.

FIG. 3 illustrates an electrode holder useful in measuring characteristics of gas-consuming or generating electrodes. The electrode holder, generally designated 60, comprises a solid body 62 of a nonconductive material defining a gas inlet passage 64 communicating with a cell gas chamber 66 which, in turn, communicates with a gas outlet passage 68. (A typical material of construction for the body 62 is 3M's Kel-F brand chloro fluorocarbon polymer.) An annular electrode seat 70 is defined in the body 62 in order to position an electrode assembly (not shown in FIG. 3) which includes a gas diffusion electrode, generally designated 72, adjacent the cell chamber 66. A conductive (e.g., platinum) wire 74 contacts the seat 70 and extends therefrom through the outlet passage 68. A threaded plug 76 of the same material as the body 62 retains an electrode assembly 80 (shown in FIG. 4) in place in the body 62.

Figure 4:
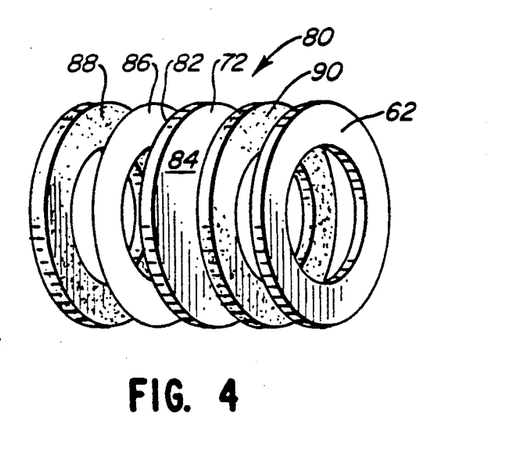
FIG. 4 is a schematic exploded perspective view of an electrode assembly adapted for use with the electrode holder of FIG. 3.

FIG. 4 illustrates the electrode assembly, generally designated 80, which includes the gas diffusion electrode 72 of FIG. 3. The electrode 72 is shown in schematic form in FIG. 4 and formed as a cylindrical disk defining gas and electrolyte contacting sufaces 82 and 84, respectively. These surfaces are analogous to surfaces 15 and 17 of FIG. 1. An annular conductive metal (e.g., platinum) ring 86 is disposed on the gas surface 82 between the gas surface 82 and an annular rubber gasket 88. A similar rubber gasket 90 is disposed on the electrolyte side of the electrode 72 between the electrolyte contacting surface 84 and an annular ring 92 of the same material as the body 62.

When the assembly 80 is in place in the seat 70 of the electrode holder 60, the ring 86 is in electrical contact with the wire 74 and acts as a current collector.

Figure 5:
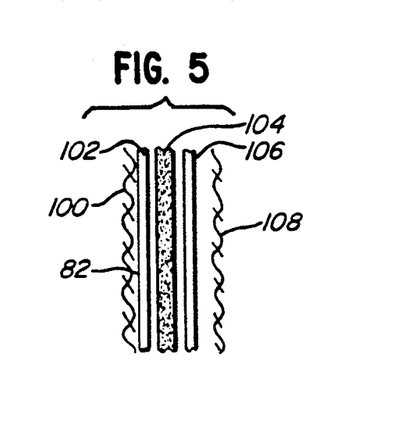
FIG. 5 is a schematic transverse sectional view of an electrode as used in FIGS. 3 and 4.

The electrode 72, as shown in FIGS. 3 and 4, is schematic and these figures do not illustrate certain components, such as the hydrophobic backing layer and associated screens. FIG. 5 illustrates an exploded sectional schematic view of a typical embodiment of the diffusion electrode 72. A silver-plated nickel screen 100 is adjacent to and in contact with an electronically conductive hydrophobic backing layer 102, typically of Teflon brand PTFE on carbon black, which defines the surface 82. An active layer 104, which may include a catalyst on carbon black, is adjacent to the layer 102 and defines the surface 84. A hydrophilic layer 106 is applied to the surface 84 and is in contact with a steel reinforcement screen 108. The layer 106 is described in detail below.

When constructed, the screen 100 is not in physical or electrical contact with the ring 86 and thus merely acts as a physical restraint. The gas inlet passage 64 and gas outlet passage 68 are connected with gas flow regulating means (not shown) which regulate the flow of gas through the passages 64 and 68 and the cell chamber 66, and thus the gas pressure in the chamber 66.

When the electrode 72 is in place in the assembly 80 in the electrode holder 60, a central circular segment of each of the electrode surfaces 82 and 84 is exposed to gas and electrolyte sources, respectively. The electrode holder body 62 is positioned in a test cell such that the electrode surface 84 is exposed to a flowing or non-flowing (e.g., stirred) electrolyte. The remainder of the cell and associated temperature control means, etc., are omitted for clarity.

For operation at elevated gas/electrolyte differential pressures, the steel screen 108 acts as a reinforcement to prevent physical rupture of the electrode 72. Flow-through of gas from the cell chamber 66 through the electrode 72 into the electrolyte side of the cell is prevented by the layer 106 as described below.

The layer 106 is formed in situ on the active layer surface 84 of the electrode. The layer is of an ionomeric hydrogel which is substantially impermeable to the gross passage of gas. The layer 106 is ionically conductive and can conduct hydroxide ($OH^-$) ions as well as water. It is also possible for bulk electrolyte to slowly diffuse through the polymer film. The electrode 72 may be effectively wetted by passage of liquid electrodes through the layer 106, while the layer 106 is virtually impermeable to gas flow.

The hydrogel-forming coprecipitation reaction takes place between at least two precursor polymers which can react together to coprecipitate to form a hydrophilic hydrogel which is insoluble or substantially insoluble in the electrolyte. Preferably, each precursor polymer is individually soluble in the electrolyte as this facilitates removal of any excess reactant after hydrogel formation.

At least one of the precursor polymers is an ionic polymer. Where the electrolyte is an alkaline electrolyte, it is preferred that a cationic polymer (e.g., containing ammonium or pyridinium groups, either pendant or part of the polymer chain) is reacted with an anionic or non-ionic polar polymer. In alkaline media, it is preferred that the ratio of the number of equivalents of the cationic to the anionic polymer be greater than 1. In acidic media, this ratio is typically reversed.

If each precursor polymer is an ionic polymer, the reaction product may be referred to as an "ion pair bonded polymer."

The method of formation of the hydrogel layer is very simple: the precursor polymers are individually applied to the electrode surface, as by application of a solution thereof. Preferably, the first precursor polymer solution is applied to the surface, followed by application of the second precursor polymer solution.

As stated above, the ratios of the number of equivalents of the respective precursor polymers will generally be greater than and typically in the range of 3-100:1, depending on the type of electrolyte to be used. In the case of an alkaline electrolyte, the ratio of the number of equivalents of the cationic polymer applied as compared to the number of equivalents applied anionic polymer will generally be greater than one and may range as high as 100:1 or more. In this case, the cationic polymer would typically be applied first followed by application of the anionic polymer solution.

This is conveniently carried out by varying the concentrations of the polymers in their respective solutions, with application of approximately equal volumes of polymer solutions.

Application of the precursor polymer solution to the electrode layer results in independent absorption of the respective solutions into the body of the electrode, where the coprecipitation reaction takes place. Thus, while the exterior surface of the electrode is coated with the hydrogel layer, it is to be understood that the layer will, in most cases, extend at least partially into the body of the electrode.

Any solvent which does not damage the electrode structures and in which the polymers are soluble may be used, including aqueous solvents, alcohols, ethers or other organic solvents. It is preferred, however, to apply at least one and preferably both of the precursor polymers in low polarity organic solution whereby premature swelling of the polymers is avoided or minimized.

It is important that the coprecipitated hydrogel be swellable upon contact with electrolyte, as this enhances the gas impermeability characteristics of the layer.

Although a wide variety of precursor polymers are applicable, the currently preferred cationic polymer is poly (diallyl dimethyl ammonium chloride), abbreviated pDMDAAC. The currently preferred anionic polymer is poly (styrene sulfonic acid), abbreviated PSSA. Both materials are available from Polysciences of Warrington, Pa. pDMDAAC is available as a 15 wt. percent solids solution in water, while PSSA is available in a molecular weight of 70,000, in a 30 wt. percent solids solution in water. The equivalent weights for pDMDAAC and PSSA, respectively, are 161 and 185.

Although each of these materials probably would provide a pressure tolerant gas diffusion electrode in that they do not microscopically pass gases, and both contain and pass ions, each of these polymers is independently soluble in the electrolyte and would promptly wash off of the electrode surface once placed in use. However, the combination of the two polymers with opposite charges on the molecular strands thereof results in a coprecipitated, insoluble hydrophilic gel.

This gel retains substantially all of the advantageous qualities of the original components, yet is insoluble in the electrolyte and should not wash off of the electrode. After exposure to water, such a gel may contain up to 99.5 wt. percent (or more) water.

In a preferred form of the invention, the first precursor polymer is a cationic polymer and the second precursor polymer is an anionic polymer, which is perfluorinated. A preferred perfluorinated polymer is a perfluorosulfonic acid polymer sold by Du Pont under the trademark NAFION (equivalent weight=110). Nafion solution in lower alcohol from Adrich is useful, and is currently available from Solution Technology, Mendenhall, Pa. This is a chemically stable ion exchange resin.

Reaction of the cationic polymer with the perfluorinated anionic polymer results in a partially fluorinated hydrogel. This hydrogel is expected to have the particular advantage of high oxygen solubility and low rates of chemical decomposition. In general, in electrochemical systems it is advantageous to utilize fluorinated components, especially perfluorinated materials, due to the extreme resistance to chemical attack of such materials.

Furthermore, for systems using oxygen, the relatively high solubility of oxygen in fluorocarbon materials is advantageous. In particular, the use of fluorinated species in gas diffusion electrodes provides twofold advantages. The high oxygen solubility results in improved electrode (e.g., cathode) voltages, while enhanced chemical stability results in the delay of failure of the device due to chemical attack of the fluorinated species.

EXAMPLES

The following specific examples are given to illustrate the practice of the invention but are not to be considered as limiting in any way.

The following generalized experimental procedure was used in each example.

Cobalt tetramethoxyphenyl porphyrin (CoTMPP) was adsorbed on Vulcan XC-72 carbon (Cabot) by agitating a suspension of the latter in a solution of $10^{-4}$ M CoTMPP in acetone for at least 24 hours. The amount of the adsorbed macrocycle was calculated spectrophotometrically by determining its loss from the filtered solution. The solid catalyst/carbon was air-dried and then heat-treated to 450° C. in a horizontal tube furnace under continuous flow of purified argon.

Porous gas-fed electrodes were fabricated as follows: dilute (~2 mg/mL) Teflon T30 B aqueous suspension (Du Pont) was slowly added to an aqueous suspension of the catalyst/carbon while the latter was ultrasonically agitated. The mixed suspension was then filtered with a 1 μm pore size polycarbonate filter membrane. The paste was worked with a spatula until slightly rubbery. The paste was shaped into a 1.75 cm diameter disk in a stainless steel die using hand pressure. This disk was then applied to another disk (~0.5 mm thick) of Teflon-carbon black hydrophobic porous sheet material (Eltech Systems Corp., Fairport Harbor, Ohio), which contained a silver-plated Ni mesh. This dual layer disk was pressed at 380 kg cm$^{-2}$ at room temperature and then heat-treated at 290° C. for 2 hours in flowing helium.

The gas-fed electrode was placed in Teflon/Kel-F electrode holder, as shown in FIG. 3. The gas (O$_2$ or air) pressure was applied to the back-side (hydrophobic layer) of the electrode and was monitored at the outlet. A needle valve at the outlet was used to regulate the gas pressure.

The O$_2$ reduction measurements for the gas-fed electrodes were done galvanostatically in concentrated alkaline electrolyte (0.5 M LiOH in 2:1 v/v 50% NaOH and 45% KOH) at 80°–83° C. with a research potentiostat (Stonehart Associates, Model BC1200). This potentiostat is equipped with positive feedback IR drop compensation and correction circuits. The IR drop correction adjustment is made while monitoring the potential on an oscilloscope, with the current repetitively interrupted for 0.1 ms every 1.1 ms. This procedure connects for any IR drop that is external to the electrode itself. Nickel foil was used as the counter electrode and a Hg/HgO, OH$^-$ reference electrode was used. The polarization curves were recorded under steady-state conditions.

Figure 6:
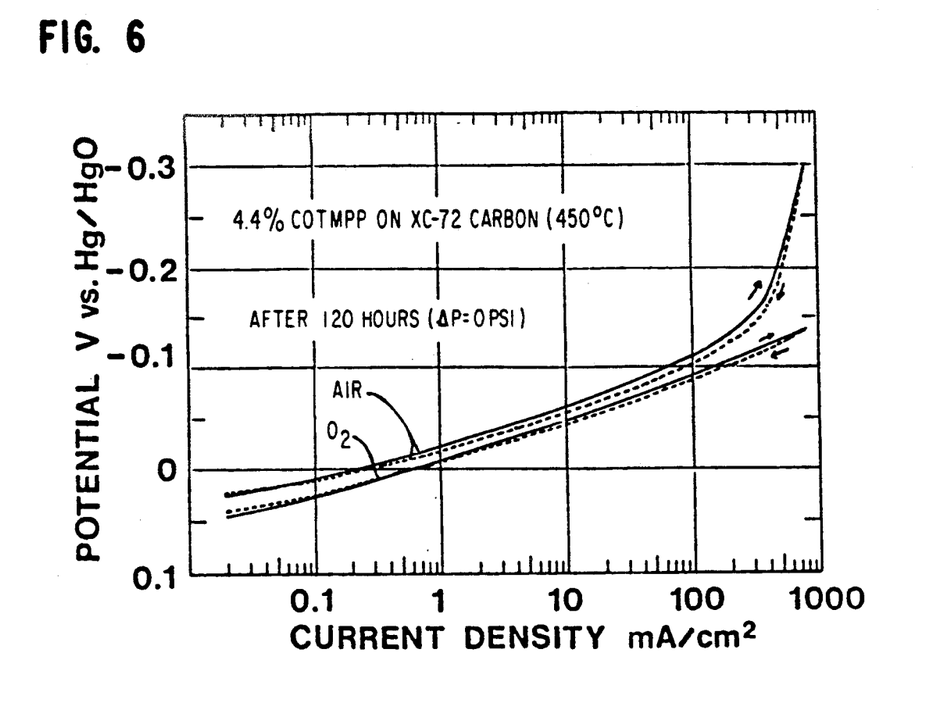
FIG. 6 is a series of polarization curves for oxygen reduction exhibited by an electrode made according to the invention at zero differential pressure.

FIG. 6 illustrates a series of oxygen reduction polarization curves for an electrode made as described above, wherein the electrolyte contacting side of the electrode was first coated with pDMDAAC then with PSSA, in a 10:1 (pDMDAAC:PSSA) weight ratio (11.5:1 equivalent ratio). Runs were conducted using air and oxygen fed systems and measurements were taken after operation at 120 hours at a differential pressure of substantially zero. (Measurements in each case were taken at both increasing and decreasing current densities.) The results shown in FIG. 6 are excellent, with the potential at a current density of 100 mA/cm$^2$ being approximately −0.085 to −0.090 V, which is only ~15–20 mV more negative than that for an electrode without polymer film.

Figure 7:
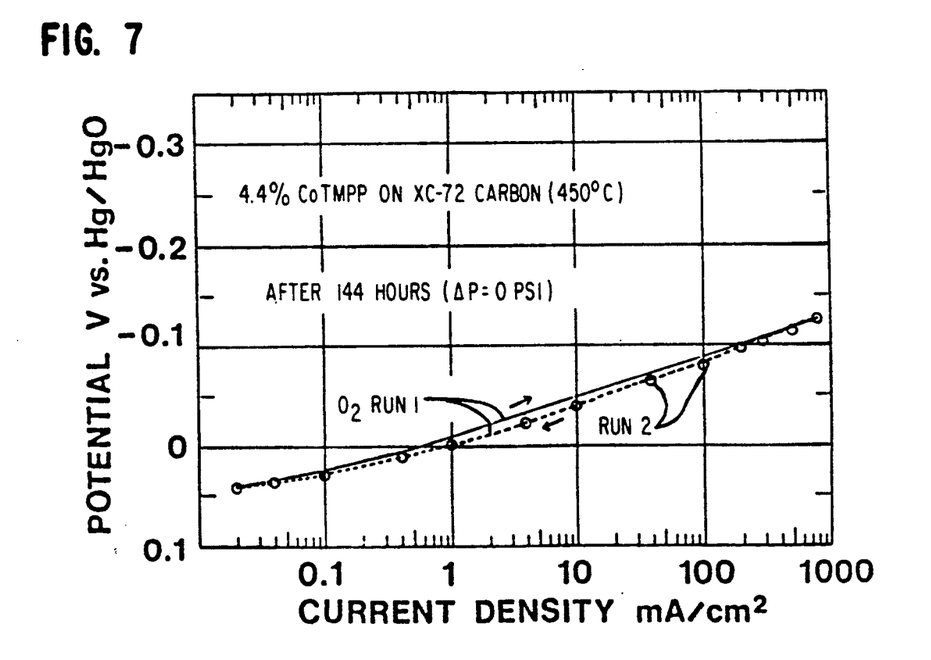
FIG. 7 is a series of polarization curves for oxygen reduction exhibited by an electrode made according to the invention at a differential pressure of 4 psi.

FIG. 7 illustrates an oxygen reduction polarization curve for the same electrode run with oxygen at the relatively high differential pressure of 4 psi (28 kPa). The electrode was first broken in by operation at 144 hours at a differential pressure of zero. Measurements were taken first with increasing current density and then with decreasing current density. As shown in FIG. 7, results at 4 psi were excellent.

Figure 8:
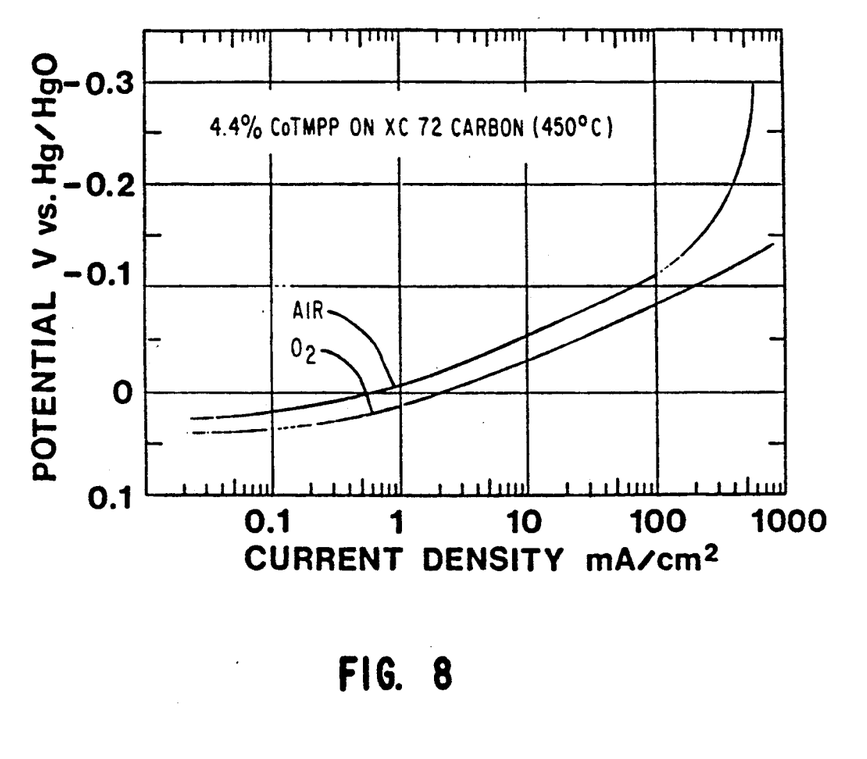
FIG. 8 is a series of polarization curves for oxygen reduction carried out with another electrode made according to the invention.

FIG. 8 illustrates the results of runs with air and oxygen using a differential pressure of 4 psi, but with a hydrogel layer formed first by application of a layer of pDMDAAC, followed by application of PSSA solution at a 100:1 (pDMDAAC:PSSA) weight ratio (115:1 equivalent ratio). Both materials were applied from methanol solution.

Figure 9:
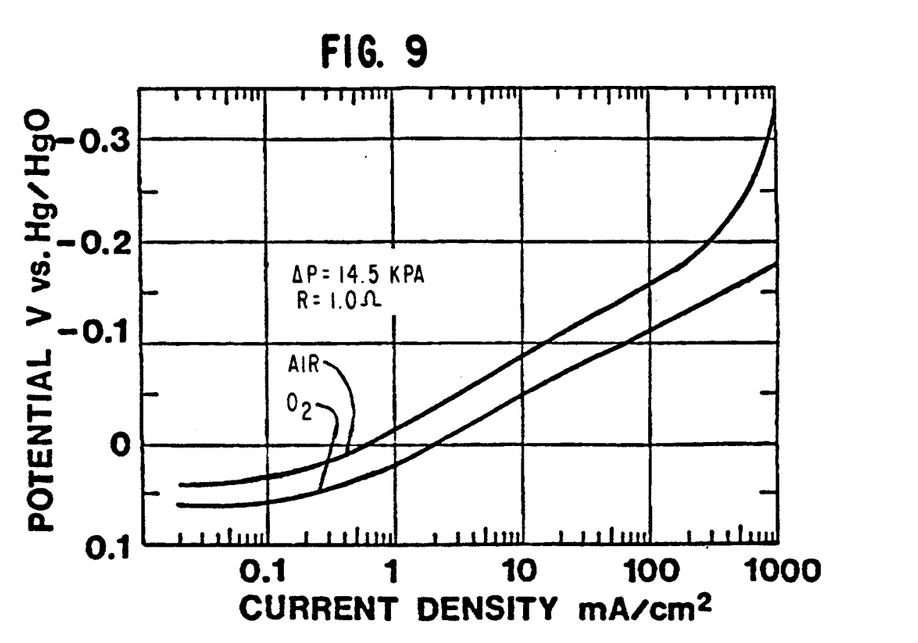
FIG. 9 is a series of polarization curves of another electrode made according to the invention using a fluorinated hydrogel layer; and, FIG. 10 is a plot of potential vs. time of another inventive electrode.

FIG. 9 depicts oxygen reduction polarization curves for an air cathode which had been treated with a combination of reactants which coprecipitated a fluorinated hydrogel. The inventive layer was placed on the electrode by first applying a layer of pDMDAAC (0.3 mL 15 wt. percent pDMDAAC in 3 mL methanol) followed by application of a methanol solution of Nafion polymer (0.1 mL at 5 wt. percent) a 9:1 weight ratio (61.5:1 equivalent ratio of pDMDAAC to Nafion). A differential pressure of 14.5 kPa was used with no gaseous blow-through. This corresponds to a differential pressure of about 2.1 psi.

Figure 10:
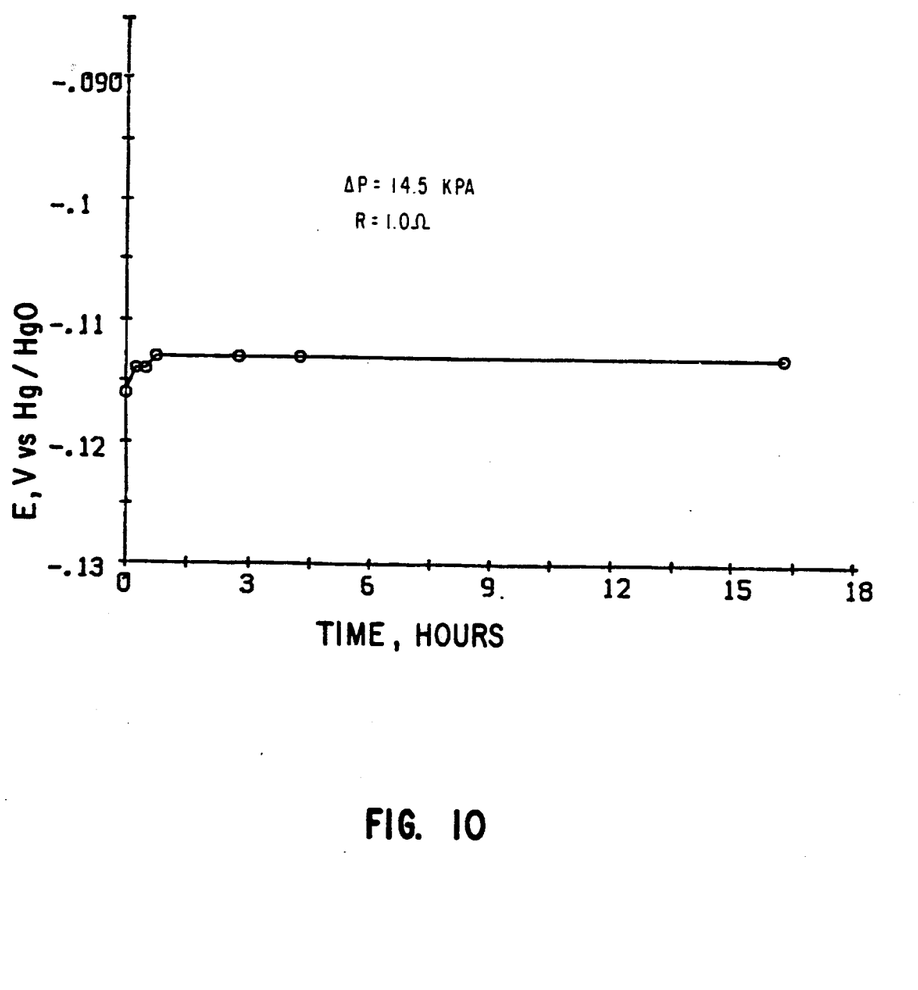

FIG. 10 depicts the results using a similar gas diffusion electrode where, however, the two precursor polymers pDMDAAC and Nafion in methanol (9:1 weight ratio or 61.5:1 equivalent ratio) were intimately mixed immediately prior to application to the electrode surface. (Tests were run with oxygen.) This appears to yield a higher resistance to blow-through in that no gas flowed through the electrode at about 14.5 kPa. The extreme stability of the electrode over the 16–17 hours of the run should be noted.

Operation at high current densities (e.g., up to about 1 A/cm$^2$ or more) is possible according to the invention.

Examination of the polarization curves presented above shows that according to the invention, very great increases in current (i.e., in current density) are available with only minor increases in the potential driving force over a wide range of current densities. (The Table/plats are relatively linear in FIGS. 6 and 7 and exhibit about 0.039 V/decade current slopes.)

The foregoing detailed description is given for clearness of understanding only, and no unnecessary limitations are to be inferred therefrom, as modifications within the scope of the invention will be obvious to those skilled in the art.

We claim:

1. A gas diffusion electrode adapted for use in a gas generating or consuming electrochemical cell utilizing a liquid electrolyte, said electrode comprising an electronically conductive and electrochemically active porous body defining respective mutually exclusive gas and electrolyte contacting surfaces, and a substantially gas impermeable layer covering substantially the entire said electrolyte contacting surface, said layer comprising an electrolyte-insoluble, ionomeric ionically conductive hydrophilic hydrogel formed on said electrolyte-contacting surface by coprecipitation between at least first and second precursor polymers, wherein said hydrogel layer is formed in situ on said electrolyte contacting surface by independent application thereto of respective solutions of said precursor polymers in solvents in which the hydrogel in insoluble, wherein said first precursor polymer contains cationic groups and said second precursor polymer contains anionic or non-ionic polar groups.

wherein said electrolyte is an alkaline aqueous electrolyte and the ratio of the number of equivalents of said first precursor polymer to said second precursor polymer is greater than 1, and wherein said first precursor polymer comprises poly (dimethyl diallyl ammonium chloride) and said second precursor polymer comprises poly (styrene sulfonic acid).

2. The electrode of claim 1 wherein said ratio is in the range of about 3-100:1.

3. The electrode of claim 1 wherein substantially equal volumes of said polymer solutions are applied to said electrolyte contacting surface.

4. The electrode of claim 1 wherein said first precursor polymer solution is applied to said electrolyte contacting surface prior to said second precursor polymer solution.

5. The electrode of claim 1, wherein said porous body comprises a laminate of a porous hydrophobic layer defining said gas contacting surface, and a porous active layer defining said electrolyte contacting surface, said active layer comprising an electrochemically active material.

6. The electrode of claim 5, wherein said electrochemically active material comprises carbon.

7. The electrode of claim 5, wherein a catalyst is adsorbed on said active material.

8. The electrode of claim 7, wherein said catalyst is cobalt tetramethoxyphenyl porphyrin.

9. An electrochemical cell, comprising:

(a) a gas diffusion electrode comprising an electronically conductive and electrochemically active porous body defining respective mutually exclusive gas and electrolyte contacting surfaces, and a substantially gas impermeable layer covering substantially the entire said electrolyte contacting surface, said layer comprising an electrolyte-insoluble, ionomeric ionically conductive hydrophilic hydrogel formed on said electrolyte-contacting surface by coprecipitation between at least first and second precursor polymers, wherein said hydrogel layer is formed in situ on said electrolyte contacting surface by independent application thereto of respective solutions of said precursor polymers in solvents in which the hydrogel is insoluble.

wherein said first precursor polymer contains cationic groups and said second precursor polymer contains anionic or non-ionic polar groups, wherein the ratio of the number of equivalents of said first precursor polymer to said second precursor polymer is greater than 1, and wherein said first precursor polymer comprises poly (dimethyl diallyl ammonium chloride) and said second precursor polymer comprises poly (styrene sulfonic acid;

(b) a counter electrode spaced from said gas diffusion electrode;

(c) a first compartment having a liquid electrolyte contained therein said liquid electrolyte being in contact with said counter electrode, said liquid electrolyte also being in contact with said electrolyte contacting surface of said gas diffusion electrode, wherein said electrolyte is an alkaline aqueous electrolyte;

(d) a second compartment having a gas therein, said gas in said second compartment being in contact with said gas contacting surface of said gas diffusion electrode but not in contact with said electrolyte contacting surface of said gas diffusion electrode; and, (e) circuit connections between said gas diffusion electrode and said counter electrode.

10. The cell of claim 9, wherein said gas is an oxygen-containing gas.

11. The cell of claim 10, wherein said gas is air.

12. The cell of claim 9, wherein at least one of said liquid electrolyte and said gas are flowed through said cell.

13. The cell of claim 9 wherein said ratio is in the range of about 3-100:1.

14. The cell of claim 9 wherein substantially equal volumes of said polymer solutions are applied to said electrolyte contacting surface.

15. The cell of claim 9 wherein said first precursor polymer solution is applied to said electrolyte contacting surface prior to said second precursor polymer solution.

16. The cell of claim 9, wherein said porous body comprises a laminate of a porous hydrophobic layer defining said gas contacting surface, and a porous active layer defining said electrolyte contacting surface, said active layer comprising an electrochemically active material.

17. The cell of claim 16, wherein said electrochemically active material comprises carbon.

18. The cell of claim 16, wherein a catalyst is adsorbed on said active material.

19. The cell of claim 18, wherein said catalyst is cobalt tetramethoxyphenyl porphyrin.

20. A gas diffusion electrode adapted for use in a gas generating or consuming electrochemical cell utilizing a liquid electrolyte, said electrode comprising:

an electronically conductive and electrochemically active porous body defining respective mutually exclusive gas and electrolyte contacting surfaces; and a substantially gas impermeable layer covering substantially the entire said electrolyte contacting surface, said layer comprising:
an electrolyte-insoluble, ionomeric ionically conductive hydrophilic hydrogen formed on said electrolyte-contacting surface by coprecipitation between at least first and second precursor polymers,
wherein said first precursor polymer comprises poly(dimethyl diallyl ammonium chloride),
wherein said second precursor polymer comprises poly(styrene sulfonic acid), and
wherein the ratio of said first precursor polymer to said second precursor polymer is in the range of about 3–100:1.

21. A gas diffusion electrode adapted for use in a gas generating or consuming electrochemical cell utilizing a liquid electrolyte, said electrode comprising
an electronically conductive and electrochemically active porous body defining respective mutually exclusive gas and electrolyte contacting surfaces, and
a substantially gas impermeable layer covering substantially the entire said electrolyte contacting surface, said layer comprising
an electrolyte-insoluble, ionomeric ionically conductive hydrophilic hydrogel formed on said electrolyte-contacting surface by coprecipitation between at least first and second precursor polymers, wherein said first precursor polymer comprises poly(dimethyl diallyl ammonium chloride) and said second precursor polymer comprises poly (styrene sulfonic acid).

* * * * *